US011669833B1

(12) United States Patent
Cheung et al.

(10) Patent No.: US 11,669,833 B1
(45) Date of Patent: Jun. 6, 2023

(54) BLOCKCHAIN ENDPOINT PROTECTION

(71) Applicants: 01 Communique Laboratory Inc., Toronto (CA); Talent Summit Holdings Limited, Tortola (VG)

(72) Inventors: Andrew Cheung, Toronto (CA); Alexey Shpurov, Toronto (CA); Serguei Strakhov, Mississauga (CA)

(73) Assignees: 01 Communique Laboratory Inc., Toronto (CA); Talen Summit Holdings Limited, Tortola (VG)

( * ) Notice: Subject to any disclaimer, the term of this patent is extended or adjusted under 35 U.S.C. 154(b) by 0 days.

(21) Appl. No.: 17/972,815

(22) Filed: Oct. 25, 2022

(51) Int. Cl.
*G06Q 20/38* (2012.01)
*G06Q 20/06* (2012.01)

(52) U.S. Cl.
CPC ....... *G06Q 20/3825* (2013.01); *G06Q 20/065* (2013.01); *G06Q 20/3827* (2013.01)

(58) Field of Classification Search
CPC ............. G06Q 20/3825; G06Q 20/065; G06Q 20/3827
USPC .......................................................... 705/75
See application file for complete search history.

(56) References Cited

U.S. PATENT DOCUMENTS

2019/0354962 A1* 11/2019 Spector .............. G06Q 20/3678

FOREIGN PATENT DOCUMENTS

WO  WO-2020130869 A1 * 6/2020  .......... G06F 21/602
WO  WO-2021220278 A1 * 11/2021

OTHER PUBLICATIONS

Buser et al. "A Survey on Exotic Signatures for Post-Quantum Blockchain: Challenges & Research Directions", https://doi.org, vol. 1, No. 1 Article 1, Sep. 5, 2022, 31 pages (Year: 2022).*
Dey et al. "Quantum Solutions to possible challenges of Blockchain Technology", arXiv, Oct. 11, 2021, 33 pages (Year: 2021).*
Alghamdi et al. "The Future of Cryptocurrency Blockchains in the Quantum Era", 2021 International Conference on Blockchain, IEEE, Jan. 10, 2022, pp. 544-561 (Year: 2022).*

* cited by examiner

*Primary Examiner* — James D Nigh
(74) *Attorney, Agent, or Firm* — IceMiller LLP

(57) ABSTRACT

Quantum security may be enhanced through the use of quantum-safe validators for transactions whereby the quantum-safe validators process quantum-safe addresses and signatures of parties to the transactions. Quantum safety may be added to conventional blockchain transactions, for example, via smart contracts which are executed using cryptographic interlocks to between conventional smart contract execution engines and quantum-safe validators to ensure both quantum-safe processing of addresses and signatures and legitimacy of quantum-safe validators in presenting transactions for incorporation on the chain.

20 Claims, 6 Drawing Sheets

BLOCKCHAIN ENDPOINT PROTECTION

CROSS-REFERENCE TO RELATED APPLICATIONS

This application claims priority to International Application entitled "Blockchain Endpoint Protection," filed Oct. 21, 2022, having serial number PCT/US2022/078536, the disclosure of which is hereby incorporated by reference in its entirety.

TECHNICAL FIELD OF THE INVENTION

This pertains to securing blockchain operations, e.g., by securing blockchain endpoints.

BACKGROUND

Cryptographic approaches to providing resistance to quantum computing attacks are described in publications such as, but not limited to, U.S. patent application Ser. No. 16/268,098, filed Feb. 5, 2019, now U.S. Pat. S/N 11,271,715, granted Mar. 8, 2022, U.S. patent application Ser. No. 17/689,288, filed Mar. 8, 2022, U.S. patent application Ser. No. 16/893,709, filed Jun. 5, 2020, U.S. patent application Ser. No. 17/199,892, filed Mar. 12, 2021, and U.S. patent application Ser. No. 17/689,288, filed Mar. 8, 2022, each titled "*A cryptographic system and method*," and U.S. patent application Ser. No. 17/708,426, filed Mar. 30, 2022, titled "*Systems and methods for hiding private cryptographic keys in multimedia files.*"

SUMMARY

The security of Distributed Ledger Technology (DLT) such as blockchain networks may be enhanced using quantum-safe mechanisms. For example, existing blockchains may be secured, without alteration of the existing core blockchain operations, by using quantum-safe mechanisms for the address and/or signature of one or more endpoints, thereby protecting the integrity of data entering the block chain.

A quantum-safe (QS) validator may act as an intermediary between parties performing exchanges that the parties wish to record in a distributed ledger, on the one hand, and on the other hand the entity seeing to the registration of the transaction on the ledger. For example, the QS validator may perform QS cryptographic operations which are beyond the scope of current blockchain systems to ensure that the identity of one or more parties has not been spoofed using quantum technology.

The QS validator may then provide secure proof of the QS validation to the entity via secure signature and/or other cryptographic interlocks. The secure signature may include both conventional and QS signatures. The interlock may involve the use of a commitment mechanism by the QS validator to commit secrets, retention of the secret for a current transaction, and releasing of the secret at a later time to prove, to a transaction registering entity, that information is being provided by a legitimate QS validator. In this scheme, for each transaction the QS validator provides to the registering entity a new commitment value created by applying the commitment mechanism to a new secret, and the QS validator reveals an old secret that was used to create an old commitment value associated with a recent prior transaction. The ledger registration entity may be a member of a group of blockchain miners, for example, or an entity executing a smart contract using smart contract data provided by the QS validator.

While the QS validator may process large QS addresses of parties to provide resistance to quantum computing attacks, an underlying ledger recording the transaction may not need to record the large QS addresses. For example, a blockchain record may include a hash of a QS address and/or a hash of a QS signature of one or more parties to the transaction or the QS validator. Specifically, to ensure minimum additional storage requirements in existing blockchains, for example, a QS address may be represented in the blockchain by the hash value of the QS address instead of the actual QS address.

Similarly, a distributed ledger record of a first transaction may include a first commitment value that is generated by commitment mechanism using a first secret, where the first secret that is initially withheld from the recording entity by the QS validator. For a second transaction that is the next transaction processed by the QS validator, the QS validator may release the first secret, along with a second commitment value that is generated using a second secret for the second transaction. Before recording the second transaction in the ledger, the recording entity may verify the legitimacy of the second transaction, at least in part, by applying the same commitment mechanism to the newly revealed first secret and comparing the result to the first commitment value that was provided by the QS validator and stored in the ledger.

The QS validator may be a single validator, e.g., a single server, or a network of trusted validators. For example, a root QS validator may be defined during initial deployment of a blockchain network and/or seeded in a smart contract during initiation of a smart contract system. The root quantum-safe validator may be configured to invite other quantum-safe validators to join a quantum-safe validator network.

It is noted that the benefits of the of QS validator may be realized in a wide variety of distributed ledger systems via smart contract mechanisms. Existing cryptocurrency and non-fungible token blockchains, for example, may be adapted to take advantage of QS mechanisms without alterations to existing blockchains per se.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

Figure 1:
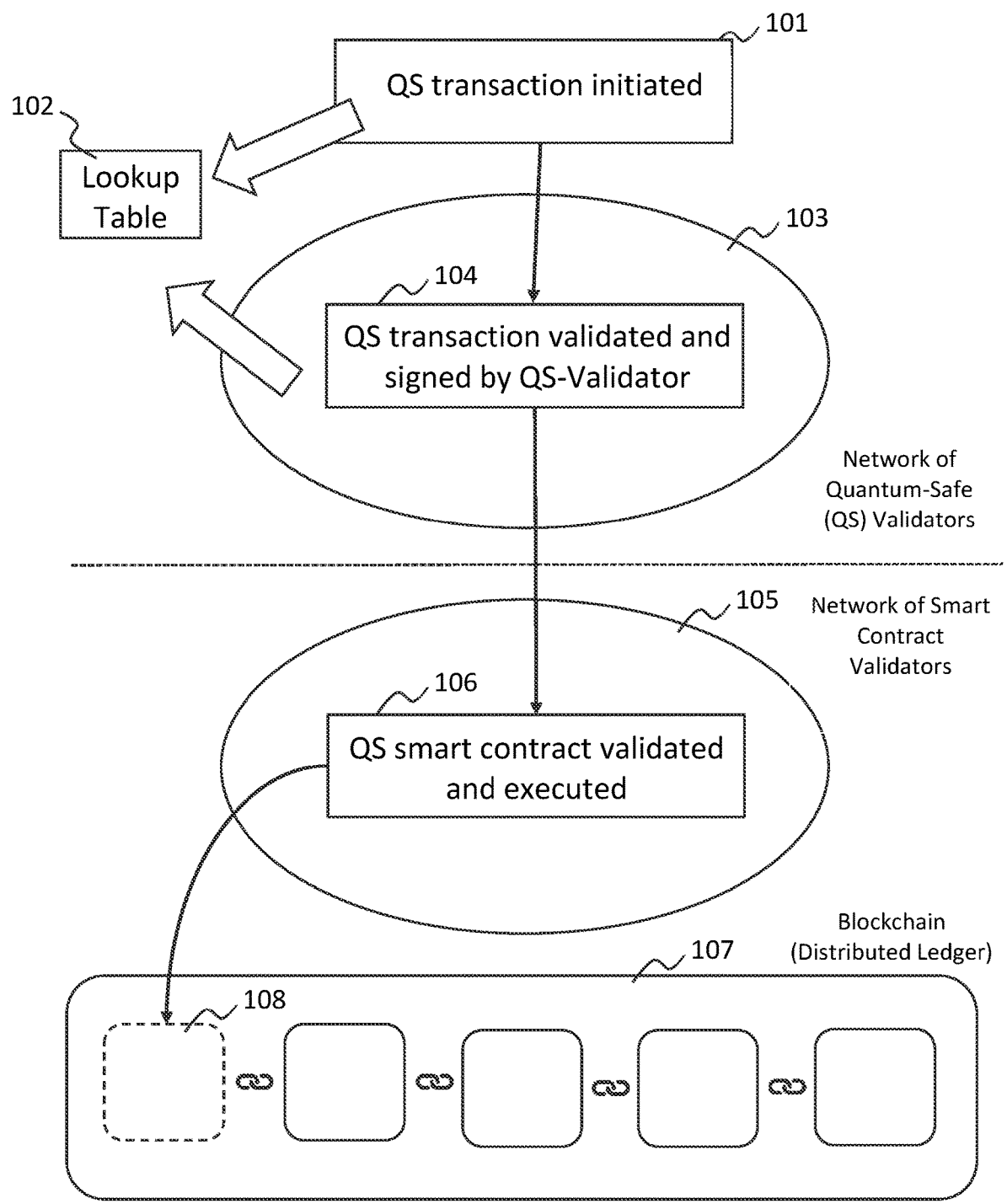
FIG. 1 is a block diagram illustrating use of a network of quantum-safe validators in conjunction with a network of conventional validators/miners using a smart contract to achieve quantum-safety for a conventional distributed ledger system.

This disclosure relates generally to providing distributed ledger operations with resistance to quantum computing attacks. The techniques described herein may be used, for example, to enhance the security of existing blockchain systems so that these blockchain operations will be safe in from attacks from quantum computers.

The development of blockchain technology has marked a new era in the world of computing. Blockchain involves distributing a database over multiple computers, as opposed to using a single central database. This is also known as Distributed Ledger Technology ("DLT") but is generally being referred to as "blockchain" by the public. DLT takes cyber-security to a new height by requiring that any new block of data proposed for inclusion in the database be not only digitally signed by an authorized node who has proposed the block of data, but also that the new block includes a hash value of the previous block of data. In a certain sense, the resulting chain of data blocks is like how DNA works in humans, where the DNA of each new individual has a signature of the parents. The complexity of the linkage makes it extraordinarily unlikely that there will be any doubt as to the continuity of the chain. This makes data entry a one-way street. Each block is a permanent link in the chain. It cannot be removed or edited. Any correction must be in the form of a new, additional block of data.

DLT further requires the chain of data blocks be replicated among numerous computers using a self-correcting mechanism. A consensus among the numerous computers, e.g., a simple majority, is required to legitimize a new block. For malicious activities to be successful, the malicious activity must simultaneously attack many nodes so that a fake transaction appears to be legitimate to a majority of the numerous computers. Otherwise, the "minority fake transaction" will be over-written by the self-correcting mechanism of the DLT.

Today most DLT/blockchain networks use traditional cryptography, such as elliptic curves and hashing mechanisms, to protect the integrity of the transactions. This is true for most permissioned and permissionless blockchains, and for cryptocurrencies such as Bitcoin, Ethereum, Solana, etc. The combination of blockchain consensus innovation and traditional cryptography is often considered to provide most secure platform for cyber-security that is practically feasible. However, concern has been raised by the prospect of the ability quantum computers which may be able to break traditional cryptography such as elliptic curve protections.

For example, while other mechanisms in DLT may not be immediately threatened by the power of quantum computers, the digital signature part is theoretically vulnerable to quantum computing attack. DLT normally uses asymmetric cryptography such as elliptic curve to sign a transaction for the party who initiates a transaction. This is to guarantee the authenticity of the initiating party. This is like the traditional financial transactions where someone needs to sign a paper in front of the bank officials to initiate a money transfer. The initiator of a transaction at a bank may be asked to present government-issued identification to the bank officials. In addition, the validators who witness the transaction, e.g., the bank officials, may need to sign and guarantee the transaction before the transaction can be added into the official ledger. In DLT today, offers of identification and signatures are done electronically, and the official ledger is a distributed electronic ledger which is confirmed by consensus among the numerous computing nodes receiving copies of the distributed ledger.

Unfortunately, the security of DLT may break down in a post-quantum world of computing when a digital signature cannot be trusted, e.g., because a signature using traditional cryptography such as elliptic curve could easily be forged using a quantum computer. In general, asymmetric cryptography techniques such as elliptic curve use a public key and private key pair for encryption/decryption and signature/verification process. The public key is used to encrypt, and the private key is used to decrypt. The private key is used to sign, and the public key is used to verify. In DLT, e.g., for cryptocurrencies, when person Alice wants to send some "coins" to Bob, Alice creates a transaction record and signs the record using Alice's private key. Then a validator/miner verifies Alice's signature using Alice's public key. The validator/miner may also check other constraints, e.g., making sure that Alice has enough "coins" to fulfill the transaction. Then the validator signs the transaction, e.g., using a key of the validator, and adds the transaction to the blockchain.

What if the private key of Alice or the key the validator could be forged? If so, a malicious user could, for example, impersonate Alice by creating a transaction to transfer "coins" from A to the malicious user's address. The integrity of the chain is then destroyed by introducing falsified information from an endpoint. The blockchain record would still be permanent, but it would contain false information.

In the classical world of computing, it is virtually impossible to forget the private key. The word "virtually" is used because in cryptography there is no such thing as being absolutely uncrackable. The strength of a cryptography pertains to, in practical terms, how long it would take to find a solution by "brute force" by trying all possible combinations. Today, it would over 150 years for a traditional supercomputer to "brute force" reverse engineer the private key from the public key. Therefore, the use of private keys and public keys is currently considered to be safe because the "brute force" time required is longer than the average lifespan of a human.

However, in theory, quantum computers have the potential to disrupt this scenario. Quantum computing is a mechanism originally proposed by scientists such as Paul Benioff and Richard Feynman in the early 1980s. It is based on quantum-mechanical phenomena such as superposition and entanglement so that computational steps can be carried out simultaneously, rather than sequentially as done on traditional digital computers. Over the years, several algorithms have been accepted as being capable of cracking the private and public key relationship by having the ability to reverse engineer the private key back from the public key.

In one of the most well-known examples, in 1994 Peter Shor showed that theoretically a quantum computer (if someone can ever successfully build one) would be able to factor large number in polynomial time. Therefore, it would possibly break the public/private key mechanism. Shor's Algorithm is designed to run on a quantum computer. Basically, Shor's Algorithm is a process of period-finding, which is done by the Quantum Fourier Transform (QFT), which takes some function f(x) and figures out the period of the function. QFT can be done efficiently on a quantum computer because it can have all the experiments running at once in superposition, with bad experiments deteriorating from destructive interference effects and the good experiments dominating from constructive interference effects. The rest of Shor's Algorithm is entirely a classical algorithm. Once we have the period-finding mechanism of the QFT, we can exploit it to find patterns in the mathematical structure of the number we are trying to factor.

While modern science has not so far allowed the development of quantum computers as originally conceived, recent experiments show promise. There are low speed working models. Although it may still be years or decades before they become commodity items, some level of quantum computers may already be available via the cloud today.

As discussed above, the weakest link in DLT when facing the threat of quantum computers is the digital signature. In other words, to make DLT becomes quantum-safe, the most imminent requirement is to replace the digital signing mechanism with a post-quantum cryptography, i.e., a quantum-safe (QS) mechanism, which ensures reliability of the signatures of the transaction initiators as well as signatures of the validators.

Today, post-quantum cryptography algorithms are well-known. Several post-quantum cryptography algorithms available. Any of these, or their equivalents, are suitable for present purposes. In this disclosure, we describe, inter alia, how to apply post-quantum cryptography algorithms to an existing DLT to achieve quantum safety.

The quantum-safe concern today is addressed in the world of post-quantum cryptography studies. In general, it is believed that at some point all the blockchains will be replaced and new blocks and transactions will be formed using a quantum-safe fashion using a post-quantum cryptography algorithm via a "hard-fork," i.e., a sudden shift to the use of quantum-safe mechanisms for the chain itself. In such a scenario, all the post-fork transactions will become quantum-safe, but all the pre-fork unconsumed transactions will be vulnerable.

However, these approaches have limitations. Some of the biggest problems of post-quantum cryptography are the sizes of key pairs and the sizes of signatures. They are typically 20×-30× the size of traditional cryptography such as that of elliptic curve. In practice, this means that QS DLT will consume more storage. Using cryptocurrency as an example, when a user tries to initiate a transaction, a fee needs to be included to put the transaction into the distributed ledger (the chain). The amount of fee depends on the complexity of the transaction and, more importantly, how much data the user wants to store within the blockchain. In other words, if we build a post-quantum blockchain by simply replacing its crypto by a post-quantum cryptography algorithm, every transaction will cost 20×-30× more. This effectively raises the practical aspect of usability of such post-quantum blockchain.

This is in addition to the technical limitation (if any) a DLT may have imposed in its internal structure such as transaction size, address size, etc. The address in a blockchain may be unable to accommodate the size of the address in the post-quantum cryptography algorithm. A key challenge addressed in this disclosure is how to implement quantum-safety in DLT without suffering any substantial size limitation, fee inflation, internal structural limitation, or degradation in throughput.

EXAMPLE SOLUTIONS

Quantum-safe validators may be used in several ways. They may serve as computational services so that endpoints themselves do not need to process large quantum-safe key pairs, for example. Further, quantum-safe validators may be linked cryptographically in networks to coordinate, for example, the management of secrets by which the security of their links to endpoint systems may be secured. Many well-known smart contract formats are in use today. New smart contract formats may be augmented for quantum safety in several ways.

FIG. 1 illustrates an example architecture incorporating several useful features which may be used separately or in a variety of combinations. In the example of FIG. 1, a smart contract paradigm is used to coordinate the data shared, the constraints tested, and the security employed by transaction originators, QS validators, smart contract executors, miners, and blockchains. Via the smart contract, quantum safety may be integrated into conventional blockchain endpoints without burdening the endpoints with quantum-safe computations or burdening the blockchain with large quantum-safe data sizes.

In FIG. 1, at 101 an endpoint, e.g., a cryptocurrency payer, proposes a transaction by initiating a smart contract. The endpoint may make use of a lookup table 102. The lookup table may be a private or a public listing of quantum-safe public keys indexed by hashes of the quantum-safe public keys. The smart contract is sent to a network 103 of quantum-safe validators which includes QS validator 104. Again, QS validator 104 may use a lookup table such as lookup table 102.

QS validator 104 may validate, and test various constraints of, the transaction proposed in the smart contract. For example, the QS validator may check a QS signature of the contract provided by the payer, confirm funds available to the payer, etc. Once the QS validator 104 is satisfied of the quantum safety of the smart contract, it adds a signature of the QS validator 104 and brief information, e.g., hashes, related to the quantum safety security measures used by the QS validator 104.

The QS validator 104 then passes the smart contract on to the convention side of operations. Alternatively, the QS validator 104 may send it back to the endpoint 101 that initiated the transaction, or another entity that manage getting the transaction recorded on a public ledger. In any case, on the conventional side is a network of conventional validator/miners, including a smart contract executor 106 which receives the smart contract. The smart contract is then interpreted by the executor 106 based on the type of smart contract. The work done by smart contract executor 106 includes processing information related to the quantum safety measures used by the QS validator 104. This work may be much less computationally intensive than the work done by the QS validator 104, and operate on much smaller pieces of information, such as information provided the smart contract data itself.

Advantages of the approach illustrated in FIG. 1 may be understood when considered in contrast to other approaches. For example, an alternative to the use of QS validators is to augment smart contract themselves with quantum-safe signatures. However, such signatures are not supported natively by today's blockchains. Quantum-safe signatures are significantly larger than conventional cryptographic signatures. Most blockchains limit the transaction size, e.g., to 1 KB. Quantum-safe signatures simply do not fit in such a limited transaction record size. Hence, quantum safety cannot be provided to convention blockchains by moving to the larger key pairs of the size needed to defend against quantum attack. Instead, a QS validator may be used to co-sign every transaction before submitting to the validators/miners of the underlying conventional blockchain.

The quantum-safe operations described herein, e.g., in relation to FIGS. 1-6, may be achieved in several ways. Hash values may be used to index and to refer to quantum-safe public keys and quantum-signatures used in smart contracts. Many hashing algorithms, such as SHA256 and SHA512 have already proven be quantum-safe, so quantum-safe security can be retained.

To be accessible to endpoints, the full un-hashed quantum-safe public keys and quantum-safe signatures may be stored a lookup mechanism outside of the blockchain network. For example, the InterPlanetary File System (IPFS) file system may be used for such a lookup mechanism. IPFS is a protocol and peer-to-peer network for storing and sharing data in a distributed file system. IPFS uses content-addressing to uniquely identify each file in a global namespace connecting all computing devices. Storing public keys and signatures in IPFS is tamper-proof because the network address is the hash of its contents and if anyone changes a signature/public key the address will be different and not matching what we have in the transaction.

Referring again to FIG. 1, a quantum-safe smart contract 101 is being created, the user who initiates the quantum-safe smart contract creates a quantum-safe signature to authenticate the smart contract. The actual quantum-safe signature and its corresponding hash value will be written to the lookup table 102 for future references by the quantum-safe validators. Only the hash value of the quantum-safe signature, not the actual quantum-safe signature, will be written to the smart contract. The user who initiates the quantum-safe smart contract will then submit the quantum-safe smart contract to the network of quantum-safe validators 103. The quantum-safe validators will verify and sign 104 the validity of the smart contract such as whether the address has enough token to fulfill the transaction, whether the quantum-safe signature is valid for the initiator, etc. During the verification process, the quantum-safe validators need to query the actual quantum-safe signature and the actual quantum-safe address of the initiator from their corresponding hash values by accessing the lookup table 102.

Figure 4:
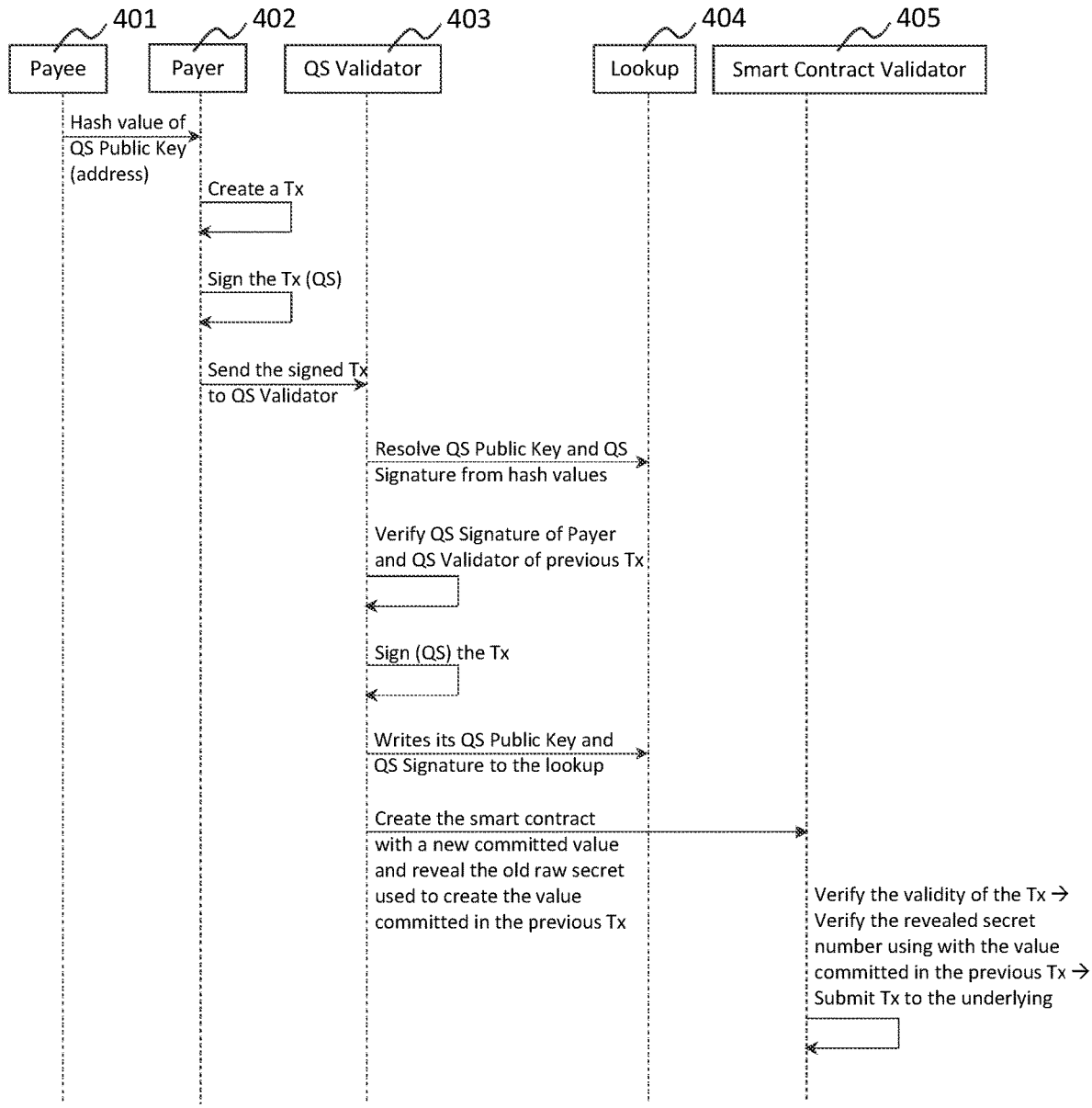
FIG. 4 is a call flow diagram of an example transaction being processed first by a quantum-safe validator, and then submitted for execution as a smart contract and entry into a conventional blockchain.

The quantum-safe validator 104 returns the validated and signed quantum-safe smart contract back to the initiator so the initiator can submit it to the conventional smart contact validators 105 of the underlying blockchain 107. Alternatively, the quantum-safe validator 104 passes the validated and signed quantum-safe smart contract to the smart contract validators 105. The smart contract validators 105 perform the conventional process of validating the transaction and then submit as a new block 108 of the underlying blockchain 107. This phase of validation, by itself, does not contribute to quantum safety. Additional mechanisms, described herein, e.g., in relation to FIG. 4, are needed to prevent invalid transactions without a proper QS signature from being validated and submitted by the smart contract validators 105 to the underlying blockchain. Further, as discussed herein in relation to FIG. 4 and elsewhere, such invalid transactions, if entered in the underlying blockchain, can be detected and ignored during the QS validation process used by the QS validators 103.

Figure 2:
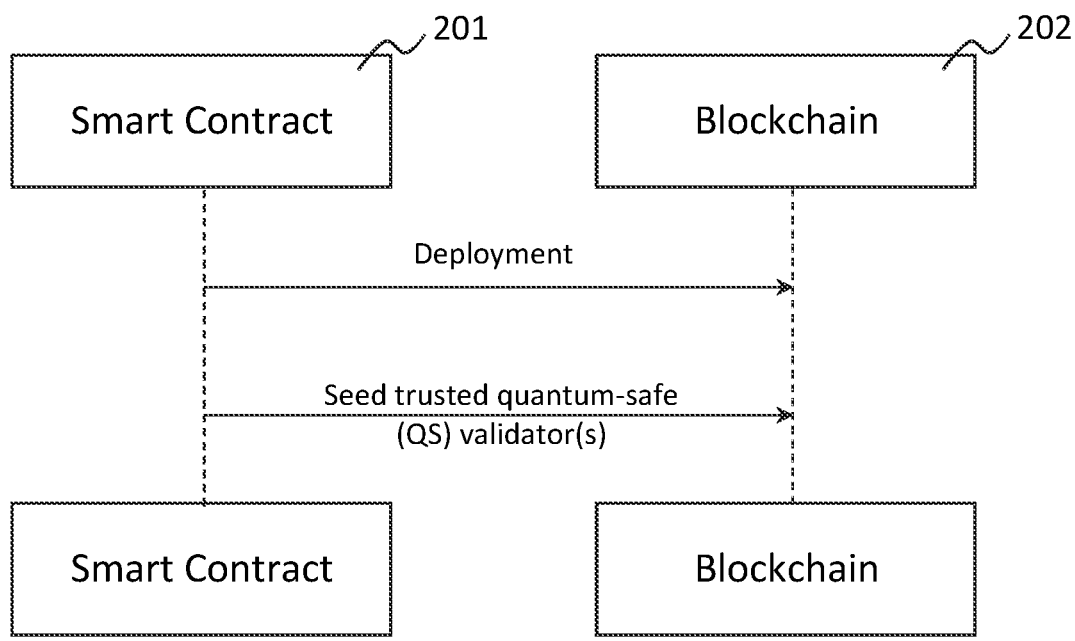
FIG. 2 is a block diagram illustrating establishment of a smart contract system with an associated network of trusted quantum-safe validators.

Referring to FIG. 2, trust to an underlying conventional blockchain 202 may be founded on the use of a separate network of quantum-safe validators to check the quantum-safe signatures. One way to do this is to select an initial quantum-safe validators, or a small group of quantum-safe validators, and obtain their public keys, then use corresponding hashes of these keys as a "root quantum-safe validators" parameter during a token contract deployment. A new record in the lookup table 102, for example, may be created to allow future query of the public keys of these "root quantum-safe validators" from their hash values. A "deployment block" may be first created whereby the root quantum-safe validators data is stored in the "deployment block" when the smart contract 201 is deployed. This contract initialization is a part of a deployment process which precedes any quantum-safe transactions on the underlying blockchain. This "deployment block" may follow the same smart contract flow of any subsequent quantum-safe token transactions of this smart contract type as illustrated in FIG. 1. For every transaction using such a quantum-safe token, the network of quantum-safe validators will check the signatures that match the public keys given in the "deployment block" of the smart contract instance.

Figure 3:
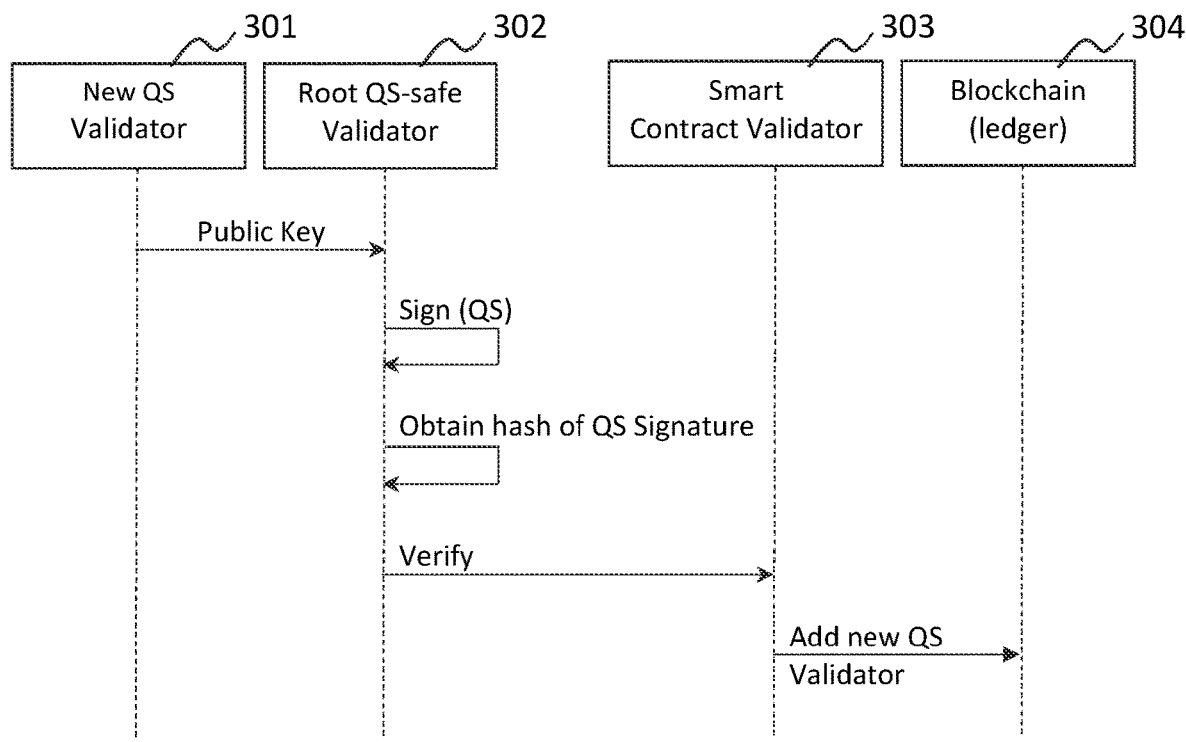
FIG. 3 is a call flow diagram in which a new quantum-safe validator joins a network of quantum-safe validators.

Referring to FIG. 3, more quantum-safe validators may need to be added to accommodate growing traffic. The mechanism of adding a new quantum-safe validator to a quantum-safe validator network is to have one of the root quantum-safe validators 302 to invite the new quantum-safe validator 301 by submitting a record of the new quantum-safe validator deployment transaction 303 on the underlying blockchain 304. This way, everyone can verify that root quantum-safe validator 302 delegated to the new quantum-safe validator 301 by the facts that: (a) the public key of the root quantum-safe validator is known via the initial "deployment block"; and (b) the public key of the root quantum-safe validator 302 was used to sign the public key of the new quantum-safe validator 301.

Inside the new quantum-safe validator deployment transaction 303, the hash value of the public key of the new quantum-safe validator 301 and the hash values of QS signature of the root quantum-safe validator 302 who invites the new quantum-safe validator 301 that signs the quantum-safe public key of the new quantum-safe validator 301 will be written.

Any number of new quantum-safe validators may be added in this fashion.

New records may be added to a lookup table such as table 102 to allow future query using the hash values of the corresponding public key of the new quantum-safe validator 301, and the quantum-safe signature of the root validator who invites and signs the public key the quantum-safe validator.

In addition, a root quantum-safe validator 302 may remove an already elected quantum-safe validator by submitting a transaction into the underlying blockchain to record the removal of the selected quantum-safe validator. During verification of such a new transaction, the quantum-safe signature of the entity proposing the transaction may be checked to see whether the transaction is coming from one of the root quantum-safe validators 302 in a root of trust checking mechanism, which means it is approved by a root quantum-safe validator 302.

FIG. 4 is a call flow of an example of a quantum-safe process for registering a transaction in a conventional blockchain using a quantum-safe validator, public lookup table, and smart contract. In the example of FIG. 4, a new transaction is created by a payer 402 who wants to pay (or transfer) something to the payee 401. In this example, the payee 401 provides a quantum-safe address of the payee to the payer 402, and the quantum-safe address of the payee is a hash value of the quantum-safe public key of the payee 401. This is analogous to a traditional financial transaction as well as conventional quantum-vulnerable cryptocurrency transaction, where the payer needs to know to whom payment should be directed. The payer 402 includes the quantum-safe address of the payee in the transaction. The payer 402 also includes in the transaction record the amount (or item) to be transferred, a quantum-safe address of the payer 402 (e.g., a hash value of the public key of the payer 402), standard signature, and a hash value of the quantum-safe signature of the payer 402.

In practice, there are many options for what to include in a smart contract for a proposed quantum-safe transaction. Using the lookup tables and similar mechanisms, it may be sufficient to identify the payee and payer to the quantum-safe validator using, e.g., only their quantum-safe addresses or, alternatively, their quantum-safe public keys. However, in this example it is assumed that, for acceptance to entered on the underlying conventional blockchain, the smart contract data must contain at least convention addresses of the payer and payer and a conventional signature of the payer. Further, certain quantum-safe information should be included in the blockchain record. The quantum-safe information that will be contained in the blockchain record should be in compact hashed form. Therefore, for purposes of the present example, it is assumed that such that smart contract data for the proposed transaction presented to the quantum-safe validator by the originating endpoint will include that information.

The originating endpoint, which in this case is payer 42, sends the information regarding to the proposed transaction is then sent to a valid quantum-safe validator 403. As discussed in reference to FIG. 3, quantum-safe validator 403 is root validator or a child of a root validator. Selection of the quantum-safe validator 403 may be achieved by many well-known methods such as a staking mechanism. The quantum-safe validator 403 may retrieve necessary quantum-safe public keys and quantum-safe signatures from their hashes by querying the lookup table 404.

If the quantum-safe validator 403 is satisfied that the proposed transaction meets all necessary constraints, e.g., as to security, authenticity, funds availability, etc., the quantum-safe validator 403 prepares a smart contract record and supporting security information. In the example of FIG. 4, the way the quantum-safe validator 403 does so takes into consideration the limitations of conventional smart contract execution mechanisms.

A smart contract is a custom program that exists on a blockchain. When a smart contract is being deployed, it is deployed along with the hash of the program itself. When a blockchain participant (e.g., a user) wants to submit a new transaction, the transaction record typically consists of: (1) the hash of the smart contract program, whereby the actual smart contract code may be resolved from the initialization block when the contract was deployed; (2) a method name; (3) input data; and (4) output data. One of the tasks of a blockchain validator/miner is to take the hash, method, and input date and run the methods to check that the result is identical to the output for a transaction to be valid. Smart contracts are deterministic. The main requirement is that the smart contract execution should be independent of the hardware to produce the same results. Practically, this is normally achieved by using a Virtual Machine, e.g., EVM in Ethereum and BPF in Solana. As a result, smart contracts may strictly limit how developers implement them, such as requiring the use of custom libraries, custom cryptography, etc. Further, smart contracts may be executed via mechanisms with limited computational and/or memory resources.

For present purposes, the quantum-safe cryptography of the quantum-safe validators 403 may be unknown to not only the smart contracts but also the validators of the underlying blockchain. Therefore, there is a need for the validators of the underlying blockchain to ensure that the transactions are coming from a trusted quantum-safe validator 403.

This is achieved in the example of FIG. 4 using a cryptographic link between the most recent previous transaction processed by any quantum-safe validator or the quantum-safe validator network and the current transaction being presented to the smart contract validators of the underlying blockchain. This cryptographic link allows the smart contract to ensure both transactions are properly performed by a trusted quantum-safe validator 403 of the network of quantum-safe validators.

The cryptographic link may be achieved by using a mechanism of cryptographical commitments whereby a new random number is privately generated by a quantum-safe validator 403 and committed for each transaction. Practically, it is like the quantum-safe validator 403 saying that it has a secret number that it is not telling you now, but the quantum-safe validator 403 will store the secret number in a way such that the quantum-safe validator 403 cannot change it. There are many well-known commitment mechanisms, such as computing a hash value.

When the quantum-safe validator 403 provides the current transaction record to the smart contract validator 405, it provides a commitment value for the current transaction. The commitment value is generated by applying a commitment mechanism to a secret that is associated with the current transaction. Further, when the quantum-safe validator 403 provides the current transaction record to the smart contract, the QS validator 403 also and reveals a secret value that is associated with the previous transaction, and that was used to create a commitment value for the previous transaction. If the most recent previous transaction was accepted by the smart contract, the commitment value for the previous transaction is available to the smart contract validator 405, either being in recent memory or retrievable, e.g., from the blockchain. The smart contract validator 405 may check the commitment value of the previous transaction against the result of applying the commitment mechanism to the newly revealed secret of the previous transaction. If the result matches commitment value of the previous transaction, the smart contract validator 405 accepts the current transaction as performed by a trusted quantum-safe validator 403. The smart contract validator 405 then causes the current transaction to be recorded in the blockchain, e.g., along with the commitment value associated with the current transaction.

Thus, for each transaction the quantum-safe validator 403 sends the old secret and a new commitment value. The smart contract validator 405 applies the commitment mechanism to the old secret and compares the result to the old commitment value. If they match, the smart contract validator 405 records the new commitment value.

A first secret may be generated when establishing a root quantum-safe validator, for example, and the commitment value generated using the first secret may be recorded in the blockchain when the first root validator is recorded on the blockchain.

To further illustrate the mechanism of a cryptographic link, consider an example where a token transaction is generally being received by one address and sent to another address in the future. These two transactions Tn and Tn+1 can be linked together using random numbers Rn−1 and Rn in the following manner:

Tn: R(n−1), from, to, amount, hash (Rn)
Tn+1: R(n), from, to, amount, hash (Rn+1)

In this manner, hash (Rn) can be reliably verified once Tn+1 happens. The "cryptographical link" is achieved by submitting a hash of this number as the cryptographical commitment and revealing this number in the next transaction. In this example, the receiving entity has the job of comparing the hash of the random number to the hash value in the previous transaction to ensure that the sender of the current transaction is a trusted.

In the example of FIG. 4, the trust to quantum-safe validator 403 is initially established during smart contract validator 405 deployment initialization, and the veracity of the current transaction is confirmed via cryptological link.

If only a random number is used for the linkage, it can be vulnerable to race attack. A race attack may occur, for example, when a hacker takes the transaction and modifies the transaction before it is recorded into blockchain and sealed in a block by adding a bigger miner's fee. The higher fee causes the false transaction to pop up higher in the transaction pool with a higher priority to be added to the next block. As a result, the false transaction may be written in the new block faster than the legitimate transaction.

To prevent a race attack, data of the transaction may be incorporated into the cryptographical commitment so that the cryptographical commitment is tied to the transaction data. There are many ways to include transaction data. For example, the data for "amount", "to", and "from" may be included, whereby the quantum-safe validator 403 commits the XOR value of the hash of the random number R with the hash of the transaction data in the following manner: hash(R) $\oplus$ hash("amount") $\oplus$ hash("to") $\oplus$ hash("from"). When a quantum-safe validator submits 403 the next transaction, it reveals the random number R. During the quantum-safe validation process in the next transaction, the smart contract simply calculates the XOR value R'=C $\oplus$ hash("amount") $\oplus$ hash("to") $\oplus$ hash("from") whereby C is the number being committed in the previous transaction and "amount", "to", "from" are data in the previous transaction. It then compares hash(R') with hash(R) whereby R is the number being revealed in the current transaction. If the two numbers match, it proves that the previous transaction is also submitted by a trusted quantum-safe validator 403 and has never been tampered in transition.

Another method of attack is to use a fake (untrusted) quantum-safe validator. An untrusted quantum-safe validator may create a fake random number, perform a commitment on this number, and put this record on the blockchain. As a result, the blockchain will end up having some fake untrusted transactions in the chain. However, these untrusted transactions are invalid to the trusted quantum-safe validators 403 because the fake random numbers are unknown to them. Therefore, the fake transactions be ignored and never used.

Fake quantum-safe validators can also be avoided by employing a chain-of-trust seeded by the root quantum-safe validator like the mechanism of a certificate chain. In practice, the root quantum-safe validator needs to sign the public key of the delegated quantum-safe validators. This signature provides strong evidence that the root quantum-safe validator is a part of such a chain-of-trust. This is how the certificate system works on the Internet today. Therefore, it may not be necessary to put such a record on the underlying blockchain. When the user chooses the initial quantum-safe validator during a new transaction, it is necessary to check to see if the quantum-safe validator is signed by the root validator. This "sanity check" can be achieved, for example, by taking the hash of the root validator and compares with that from the initialization block of the smart contract.

Multiple quantum-safe validators may be available in the network. To handle multiple quantum-safe validators, the current quantum-safe validator selected by the user application may pick a few other quantum-safe validators from the pool of all available quantum-safe validators for the next transaction. Today, there are many well-known mechanisms that may be used to pick the next set of quantum-safe validators, e.g., based on a staking level.

Since any of the trusted quantum-safe validators in the network of trusted quantum-safe validator picked for the next transaction may process the next transaction, it is necessary that all the picked validators have access to the secret of the previous transaction in order to release it for use by the smart contractor entity in validating the next transaction. This may be achieved by the release of the committed secret centrally, or by sharing the secret securely within the network of quantum-safe validators. In either case, cryptographic methods may be employed to create, keep, release, and/or share the secrets.

For example, the committed secrets may be encrypted such that they can only be decrypted by valid QS validators or be certain selected valid QS validators. There are many methods of encryption that are well-known at the time of this invention that can be used to achieve this purpose. One of the examples, but not limited to, is a standard PKI methodology whereby a random number is encrypted by the public key of each one of the selected quantum-safe validators. Another example is a multiparty homomorphic encryption whereby the random number is encrypted once by the public key common to each of the private keys of the selected quantum-safe validators. Regardless of the way being used for the encryption/decryption process, the results will be saved as a record in a look up table such as, but not limited to, IPFS containing the pairs encrypted random number and the hash of the corresponding public key of the selected quantum-safe validators. This way, the whole family of quantum-safe validators are essentially behaving as a single entity sharing the same random number. When the random number needs to be revealed in the next transaction, the quantum-safe validator in this next transaction simply queries from the look up table using the hash of its own public key to find the random number committed in the last transaction by the last quantum-safe validator.

Figure 5:
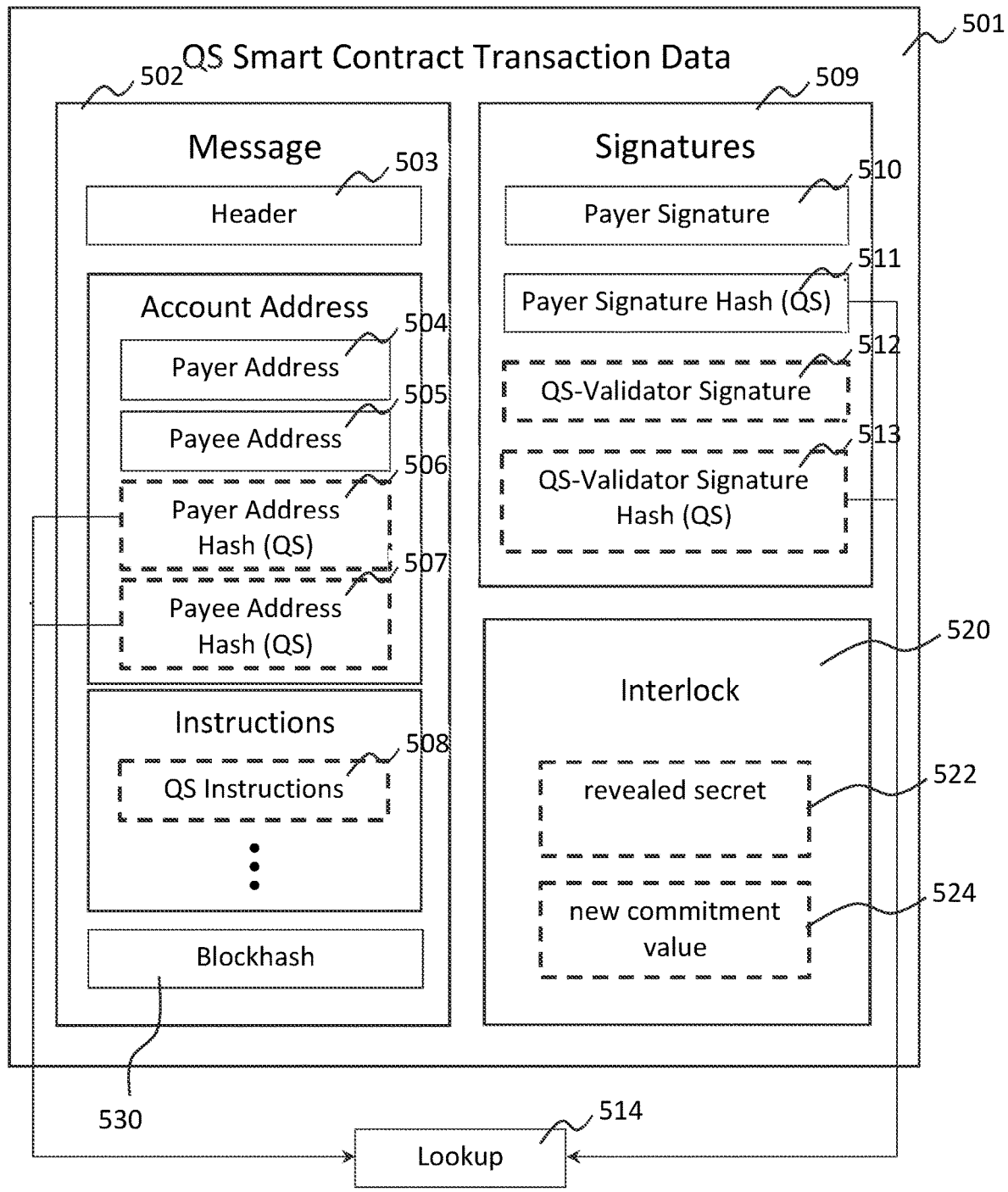
FIG. 5 is an example of data for a smart contract allowing quantum-safe verification of parties to the contract and verification of a quantum-safe validator of the contract.

FIG. 5 illustrates a set of data for an example quantum-safe blockchain smart contract. In the example of FIG. 5, the smart contract data record 501 is shown as consisting of different groups including a message 502, signatures 509, and transmission interlock data 520. In practice, how the entity executing the smart contract receives the information may be less important than that the contract is executed in accordance with the security protocols. For example, all the smart contract data 501 may be received from a trusted quantum-safe validator in a single message, or it may be gathered from several sources, e.g., with some provided by the payer, some from the blockchain, some from the payer, and some from a lookup table of quantum-safe addresses and signatures indexed by hashes.

Similarly, different items of information may be included in different quantum-safe smart contracts depending on which information is desired to be available on the chain. For example, it may suffice to identify the payer only by their conventional address on the chain, rather than including the quantum-safe address of the payer. Similarly, the smart contract itself may not need to perform a quantum-safe verification of the identity of the payer or payee if this has already been done by the quantum-safe validator. The reader will appreciate that FIG. 5 illustrates one of many ways to apply the teachings herein for using a smart contract to link quantum-safe validation to a conventional blockchain.

In the example of FIG. 5, the message 502 a transaction header 503, e.g., pertaining to the amount, item, and/or nature of the transaction. The header may also include an indication of the type of smart contract or methods to be applied. Message 502 also includes a standard payer address (public key) 504 and a standard payee address (public key) 505. Hash values of the payer's and payee's quantum-safe addresses (the quantum-safe public keys) 506 and 507 respectively, are also included whereby, if desired, the smart contract may access the full addresses via a lookup table using the hashes. Alternatively, the full QS addresses may be provided to the smart contract, e.g., by the QS validator.

Message 502 also includes quantum-safety instructions 508. These may be included in information provided for smart contract processing where, for example, the smart contract type may be used for non-quantum-safe contracts as well, and here special instructions are provided for how to validate the transaction at the smart contract level using the QS addresses of the parties (e.g., for lookup of QS keys in a table indexed by hashes), processing of the QS signatures, and processing of interlock data to ensure that the contract is received from a valid quantum-safe validator.

In the example of FIG. 5, signatures 509 also include both conventional and quantum-safe items. There is a standard payer signature 510, and a hash of the payer's quantum-safe signature 511. For the QS validator, both a standard signature 512 and the hash of a quantum-safe signature 513 are included. The entity executing the smart contract may obtain the full quantum-safe signatures via a lookup table using the hashes of the QS signatures. Alternatively, the full QS signatures may be provided for smart contract processing, with the smart contract operations being responsible for reducing the size of data ultimately provided to the blockchain.

The QS smart contract transaction data 501 also includes interlock data 520 whereby the smart contract can ensure that the data 501 is being provided by a valid QS validator. In the example of FIG. 5, the interlock data 520 includes two items. First is a newly revealed secret 522. This may be a random number that was previously hidden by the QS validator network, for example, or some other secret created using, e.g., a combination of selected transaction data and a random number. The second item of interlock data is new commitment value 524 associated with the current smart contract. If the smart contract is validated, a new chain blockhash 530 is created, and the transaction will be recorded in the chain. Along with the transaction, the hash of the new commitment value 524 will be recorded on the chain so that it is available to any smart contract processing entity that receives the next transaction from the network of quantum-safe validators.

Before approving the transaction, the smart contract checks the transaction proffered by the QS validator by applying the commitment mechanism to the old committed secret 522. For example, the old secret 522 may be a purely random number, for example, or may but derived from a random number and data from the prior transaction. The validity of the old secret 522 may be determined by applying the commitment mechanism to the old secret 522 and comparing the result to the old commitment value associated with the previous transactions. Thus, the security of the current transaction is assured by the revelation of the old secret 522, and preparations are made for the security of the next transaction by adding the new commitment value 524 to the chain.

Figure 6:
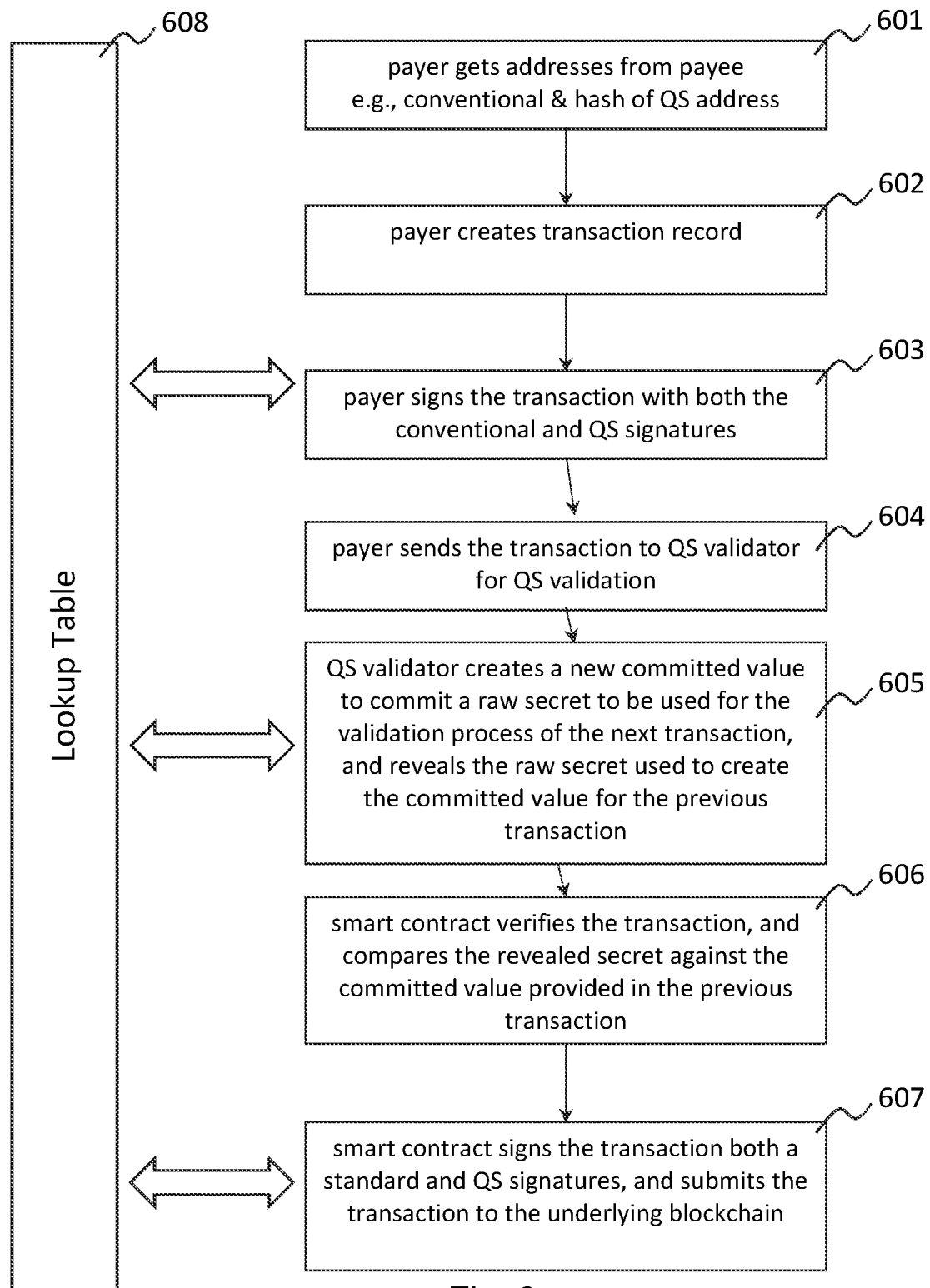
FIG. 6 is a flow chart of a blockchain transaction secured by quantum-safe mechanisms.

FIG. 6 is a flow chart of an example process incorporating security features described in relation to FIGS. 1-5. Here again a smart contract is used to record on a conventional blockchain a transaction that has been processed by a QS validator, and an interlock is used to ensure that the smart contract is dealing with information provided by a valid QS validator.

In the example of FIG. 6, at step 601 a payer obtains from a payee both a conventional address of the payee and a QS address of the payee, where the QS address of the payee is a hash of a QS public address of the payee. Typically, when a new transaction is created, e.g., when the payer wants to pay—or transfer—something to the payee, the payee informs the payer its address. In practice, the payer may obtain the necessary addresses in several ways. It may not be required for a particular smart contract, for example, to obtain a QS signature of the payee, or even to record the QS address of the payee on a conventional blockchain. Nonetheless, for added security, QS addresses and/or QS signatures of all parties may be preferred or required by the smart contract or the QS validator.

In step 602, the payer creates a transaction record that includes with the quantum-safe address of the payee. The transaction record may include basic information such as the amount or item to be transferred, conventional addresses or other identifiers of the parties, and the type of smart contract to be used for recording the transaction. In this example, the payer also includes in the transaction record the hash value of the payer's QS public key.

The payer signs the transaction with both standard/conventional and quantum-safe signatures. Both may be included in the transaction record. Alternatively, for example, the payer may place copy of its QS signature in a lookup table 608 and include a hash its QS signature in the transaction record, whereby a QS validator receiving the transaction record is able to retrieve the QS signature of the payer from the lookup table using the hash of the QS signature.

In the example of FIG. 6, in step 604 the payer sends the transaction to a trusted QS validator. The trusted QS validator may be a root QS validator a child of a root QS validator. Selection the of quantum-safe validator may be achieved by many well-known methods such as a staking mechanism.

Alternatively, for example, the payer may send the transaction record to a smart contract execution entity, and that entity may send the transaction record to the QS validator for QS processing prior to executing a smart contract based on the transaction record.

In step 605, the quantum-safe validator may test various constraints of proposed transaction, e.g., status of the parties and availability of funds or items for transfer. If approved by the QS validator, the QS validator creates and stores a new secret that will be used for the validation process of the next transaction. The QS validator applies a commitment mechanism to generate a new commitment value, e.g., a hash of the new secret, and adds the new commitment value the transaction record.

In 605, the QS validator also signs the transaction using a quantum safe private key of the QS validator. The QS validator may, for example, add a hash of its QS signature to the transaction, and stores its full QS signature in lookup table 608, e.g., indexed by the hash of its QS signature.

In 605, the QS validator sends the transaction record for smart contract processing. The record may include the information depicted in FIG. 5, for example. Notably, in 604, in addition to providing the new commitment value, the QS validator also reveals an old secret. The old secret was used to generate a commitment value associated with the most recent prior transaction processed by the QS validator—or by another member of a QS validator network to which the QS validator belongs. The newly revealed old secret may be included in the current transaction record, e.g., as shown in the example of FIG. 5, or it may be sent by other means. In the case of a transaction destined for inclusion in a conventional blockchain, the old secret and the transaction record (the latter including the new commitment value), may be sent publicly to a large number of validator/miners who will execute the transaction as a smart contract.

In step 606 the transaction is processed by a validator/miner of the underlying convention blockchain in accordance with a smart contract process that includes checking the interlock information provided with the transaction record that is provided by the QS validator. The smart contract applies the commitment mechanism to the revealed secret and compares the result to the commitment value associated with the previous transaction to verify that the QS validator of the current transaction is part of the trusted network of QS validators that handled the previous transaction.

The smart contract may also test any number of constraints of the proposed transaction and/or perform quantum-safe validation of the proffered transaction. QS validation may involve, for example, retrieving the necessary quantum-safe public keys and/or the quantum-safe signatures from their hashes by querying the lookup table 608.

Testing of constrains may include, for example, checking the transaction for consistency, e.g., that funds are not double spent, etc. This may be accomplished using various known methods, such as building a spending Merkle tree and signing the transaction with both a standard/quantum-safe digital signature and writing the corresponding records into the lookup table 608 the actual quantum-safe public keys and quantum-safe signatures before submitting the transaction to the underlying blockchain.

Once the requirements of the smart contract are satisfied, in step 607 the smart contract submits a completed record to the blockchain. Here the standard, conventional validation process of the underlying blockchain will be followed. However, for purposes of quantum safety, the conventional security steps are merely invoked add the transaction into the blockchain to use the blockchain as a secure public storage of the transaction record.

While the techniques described herein may be applied to build a quantum-safe blockchain, the processes described in relation to FIGS. 4, 5, and 6, add security for the payer and the payee by using quantum-safe mechanisms to prevent bogus transactions from being recorded on the chain undetected. The QS validators, lookup table, and modified smart contracts do not alter the blockhash or chain themselves, per se.

It will be appreciated that many variations of the processes described are possible, including alterations in which entities include which data in which interaction.

For example, the applications used by payers and payees may exist within the QS validator network, where the user's wallets are stored in the QS validator network. Alternatively, the QS validators may deal exclusively with transactions originating outside of any application under their control. Further the QS validators may deal with a mixture of proprietary wallets and transactions originating outside the network.

Payers and payees may be identified in various ways on the blockchain record, and not necessarily by hashes of their QS addresses, for example. QS addresses, QS signatures, and other QS data may be passed directly or via lookup tables, and tables may be indexed by hashes of stored items or by other rubrics.

The invention claimed is:

1. A method performed by a digital computing apparatus, the digital computing apparatus being a smart contract validator, the method comprising:
   receiving, from a quantum-safe (QS) validator via a communications network, a request to register a current transaction on a blockchain, the request comprising an indication of a payer, an indication of a payee, an indication of an item to be transferred, and an indication of a QS signature of the QS validator;
   verifying the QS signature of the QS validator;
   receiving, from the QS validator via the communications network, a new commitment value, the new commitment value being generated using a commitment mechanism on an unrevealed secret, the unrevealed secret being a committed secret associated with the current transaction and stored in the QS validator;
   receiving, from the quantum-safe (QS) validator via the communications network, a revealed secret;
   performing the commitment mechanism on the revealed secret to obtain a result;
   validating the request by comparing the result to an old commitment value, the old commitment value being associated with a most recent previous transaction processed by the QS validator;
   upon validation of the request, creating a transaction record based on the request, signing the transaction record, and submitting the transaction record for inclusion in the blockchain, wherein the transaction record comprises indicia of the payer, the payee, and the item to be transferred, and wherein the transaction record further comprises the new commitment value.

2. The method of claim 1, further comprising obtaining the old commitment value from a record on the blockchain of the most recent previous transaction processed by the QS validator.

3. The method of claim 1 wherein the request further comprises an indication of a smart contract type for the current transaction, the method further comprising adjusting the processing of the current transaction in accordance with the smart contract type.

4. The method of claim 3 further comprising obtaining software code for performing the smart contract from the blockchain.

5. The method of claim 3 wherein the request further comprises an indication of an optional method of the smart contract to be used for the current transaction, the method further comprising processing the current transaction in accordance with the optional method of the smart contract.

6. The method of claim 1 wherein:
   the request further comprises an indication of a QS signature of the payer; and
   the method further comprising verifying the QS signature of the payer.

7. The method of claim 6, wherein:
   the indication of the QS signature of the payer comprises a hash of the QS signature of the payer; and the method further comprises obtaining, from a public lookup table using the hash of the QS signature of the payer, the QS signature of the payer.

8. The method of claim 1, wherein the request further comprises a QS address for each of the payer and the payee.

9. The method of claim 1, wherein signing the transaction record comprises creating a QS signature of the apparatus for the current transaction.

10. The method of claim 9, further comprising:
creating a hash of the QS signature of the apparatus for the current transaction;
storing, in a public lookup table, the hash of the QS signature of the apparatus for the current transaction and the hash of the QS signature of the apparatus for the current transaction;
adding, to the transaction record, the hash of the QS signature of the apparatus for the current transaction.

11. The method of claim 1, wherein the QS validator is a network of QS validators.

12. The method of claim 9, further comprising:
creating a hash of the QS signature of the QS validator;
storing, in a public lookup table, the hash of the QS signature of the QS validator and the QS signature of the QS validator;
adding, to the transaction record, the hash of the QS signature of the apparatus for the current transaction.

13. The method of claim 1, wherein the QS validator is a network of QS validators.

14. The method of claim 1, wherein the smart contract validator is one of a plurality of smart contract validators that receive the second request.

15. A method performed by a digital computing apparatus, the digital computing apparatus being a quantum-safe (QS) validator, the method comprising:
receiving, from a payer, a first request to register a current transaction on a blockchain, the first request comprising a first indication of the payer, a first indication of a payee, a first indication of an item to be transferred, and a first indication of a QS signature of the payer;
verifying the QS signature of the payer;
generating an unrevealed secret for the current transaction;
generating a new commitment value by performing a commitment mechanism on the unrevealed secret;
sending, to a smart contract validator via a communications network, a second request to register the current transaction on the blockchain, the second request comprising a second indication of the payer, a second indication of the payee, a second indication of the item to be transferred, an indication of a QS signature of the QS validator, and the new commitment value.

16. The method of claim 15, wherein the second request further comprises an indication of a smart contract type to be applied by the smart contract validator for the current transaction.

17. The method of claim 16, wherein the second request further comprises an indication of an optional method of the smart contract type be used for the current transaction.

18. The method of claim 15 wherein:
the request further comprises an indication of a QS signature of the payee; and
the method further comprising verifying the QS signature of the payee.

19. The method of claim 15, wherein:
the first indication of the QS signature of the payer comprises a hash of the QS signature of the payer; and
the method further comprises obtaining, from a public lookup table using the hash of the QS signature of the payer, the QS signature of the payer.

20. The method of claim 15, wherein:
the first request further comprises a non-QS address of the payee, a non-QS address of the payer, and a non-QS signature of the payer; and
the second request further comprises the non-QS address of the payee, the non-QS address of the payer, and the non-QS signature of the payer.

* * * * *